United States Patent
Laaksonen et al.

(10) Patent No.: US 9,747,068 B2
(45) Date of Patent: Aug. 29, 2017

(54) AUDIO PROCESSING BASED UPON CAMERA SELECTION

(71) Applicant: Nokia Technologies Oy, Espoo (FI)

(72) Inventors: Lasse Juhani Laaksonen, Nokia (FI); Miikka Tapani VIlermo, Siuro (FI); Mikko Tapio Tammi, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/579,354

(22) Filed: Dec. 22, 2014

(65) Prior Publication Data

US 2016/0182799 A1  Jun. 23, 2016

(51) Int. Cl.

| H04N 5/232 | (2006.01) |
|---|---|
| G06F 3/16 | (2006.01) |
| H04N 5/247 | (2006.01) |
| H04R 1/00 | (2006.01) |
| H04S 7/00 | (2006.01) |
| H04R 3/00 | (2006.01) |
| H04R 5/04 | (2006.01) |

(52) U.S. Cl.
CPC .............. *G06F 3/16* (2013.01); *H04N 5/247* (2013.01); *H04R 1/00* (2013.01); *H04R 3/005* (2013.01); *H04R 5/04* (2013.01); *H04S 7/30* (2013.01); *H04R 2499/11* (2013.01)

(58) Field of Classification Search
CPC ..................................................... H04N 5/232
USPC .................................. 348/211.11, 231.4, 175
See application file for complete search history.

(56) References Cited

U.S. PATENT DOCUMENTS

| 2002/0116197 A1* | 8/2002 | Erten .................... G06K 9/6292 704/273 |
| 2004/0192421 A1 | 9/2004 | Kawahara ................... 455/575.3 |
| 2004/0257432 A1* | 12/2004 | Girish ..................... H04N 7/142 348/14.08 |
| 2010/0245624 A1 | 9/2010 | Beaucoup .................. 348/231.4 |
| 2012/0182429 A1 | 7/2012 | Forutanpour et al. ......... 348/175 |
| 2013/0177168 A1 | 7/2013 | Inha et al. ...................... 381/92 |
| 2013/0342730 A1 | 12/2013 | Lee et al. .................. 348/231.4 |
| 2013/0342731 A1* | 12/2013 | Lee ..................... H04N 5/23293 348/231.4 |
| 2014/0178027 A1 | 6/2014 | Lee ............................... 386/201 |

FOREIGN PATENT DOCUMENTS

| EP | 2690886 A1 | 1/2014 |
| EP | 2782098 A2 | 9/2014 |
| JP | 2007-312039 A | 11/2007 |
| WO | WO-2013/093187 A2 | 6/2013 |
| WO | WO-2014/162171 A1 | 10/2014 |

* cited by examiner

*Primary Examiner* — Joel Fosselman
(74) *Attorney, Agent, or Firm* — Harrington & Smith

(57) ABSTRACT

A method including generating respective audio signals from microphones of an apparatus; determining which camera(s) of a plurality of cameras of the apparatus has been selected for use; and based upon the determined camera(s) selected for use, selecting an audio processing mode for at least one of the respective audio signals to be processed, where the audio processing mode at least partially automatically adjusts the at least one respective audio signals based upon the determined camera(s) selected for use.

33 Claims, 15 Drawing Sheets

AUDIO PROCESSING BASED UPON CAMERA SELECTION

BACKGROUND

Technical Field

The exemplary and non-limiting embodiments relate generally to audio signals and, more particularly, to processing audio signals.

Brief Description of Prior Developments

Devices with multiple microphones are known. Devices with multiple cameras are known. Processing of audio signals to produce modified audio signals is known.

SUMMARY

The following summary is merely intended to be exemplary. The summary is not intended to limit the scope of the claims.

In accordance with one aspect, an example method comprises generating respective audio signals from microphones of an apparatus; determining which camera(s) of a plurality of cameras of the apparatus has been selected for use; and based upon the determined camera(s) selected for use, selecting an audio processing mode for at least one of the respective audio signals to be processed, where the audio processing mode at least partially automatically adjusts the at least one respective audio signals based upon the determined camera(s) selected for use.

In accordance with another example embodiment, an apparatus is provided comprising at least one processor; and at least one non-transitory memory including computer program code, the at least one memory and the computer program code configured to, with the at least one processor, cause the apparatus to: determine which camera(s) of a plurality of cameras of the apparatus has been selected for use; based upon the determined camera(s) selected for use, select an audio processing mode for respective audio signals from microphones of the apparatus to be processed, where the audio processing mode at least partially automatically adjusts at least one the respective audio signals based upon the determined camera(s) selected for use.

In accordance with another example embodiment, a non-transitory program storage device is provided readable by a machine, tangibly embodying a program of instructions executable by the machine for performing operations, the operations comprising: determining which camera(s) of a plurality of cameras of the apparatus has been selected for use; based upon the determined camera(s) selected for use, selecting an audio processing mode for respective audio signals from microphones of the apparatus to be processed, where the audio processing mode at least partially automatically adjusts at least one the respective audio signals based upon the determined camera(s) selected for use.

BRIEF DESCRIPTION OF THE DRAWINGS

The foregoing aspects and other features are explained in the following description, taken in connection with the accompanying drawings, wherein.

DETAILED DESCRIPTION OF EMBODIMENTS

Figure 1:
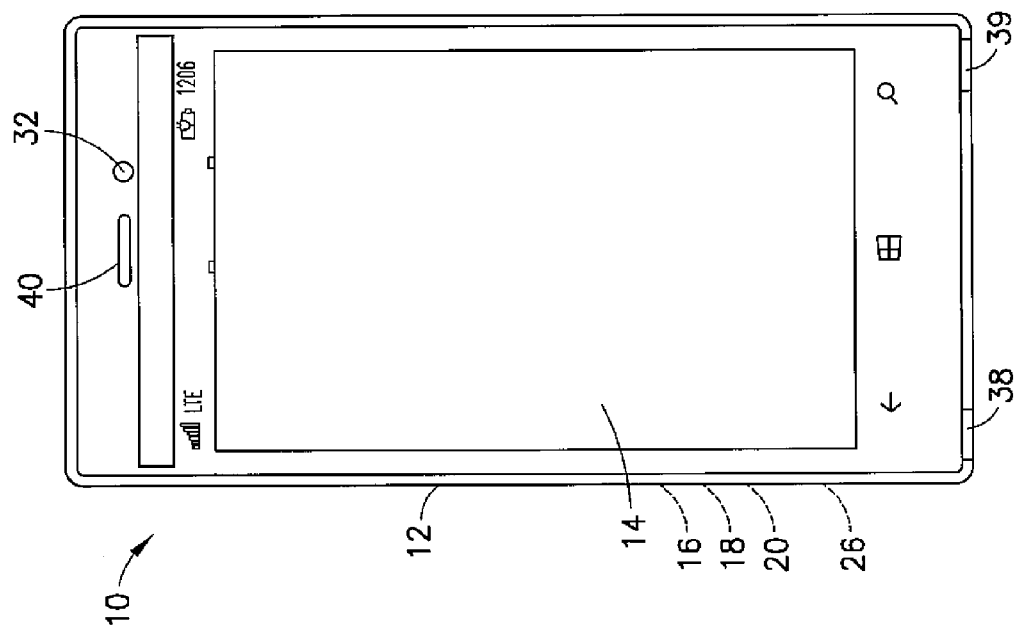
FIG. 1 is a front view of an example embodiment.

Referring to FIG. 1, there is shown a front view of an apparatus 10 incorporating features of an example embodiment. Although the features will be described with reference to the example embodiments shown in the drawings, it should be understood that features can be embodied in many alternate forms of embodiments. In addition, any suitable size, shape or type of elements or materials could be used.

The apparatus 10 may be a hand-held portable apparatus, such as a communications device which includes a telephone application for example. In the example shown the apparatus 10 is a smartphone which includes cameras and a camera application. The apparatus 10 may additionally or alternatively comprise an Internet browser application, a video recorder application, a music player and recorder application, an email application, a navigation application, a gaming application, and/or any other suitable electronic device application. In an alternate example embodiment the apparatus might not be a smartphone.

Figure 2:
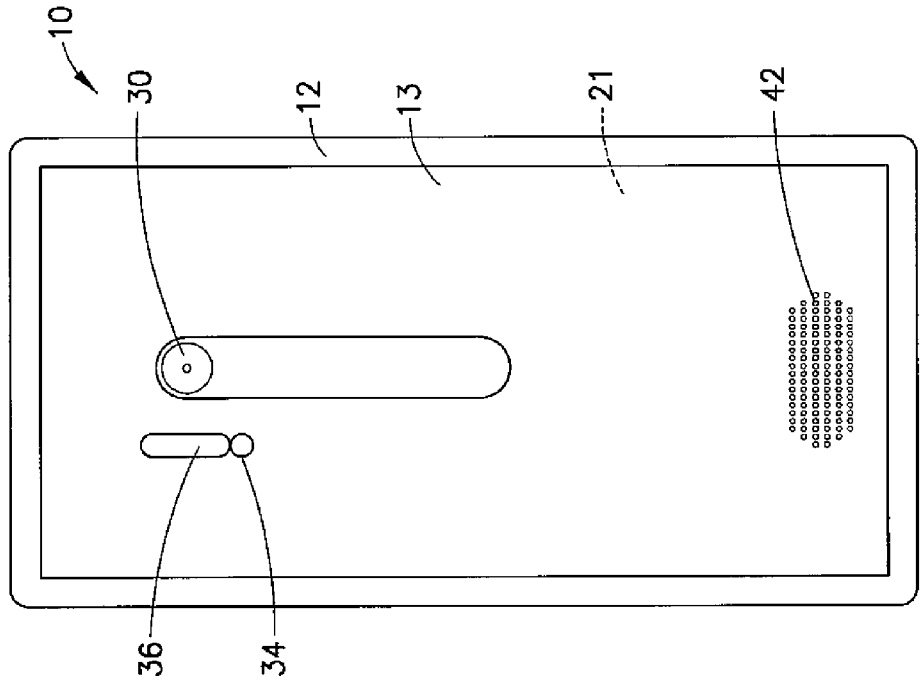
FIG. 2 is a rear view of the embodiment shown in FIG. 1.
Figure 3:
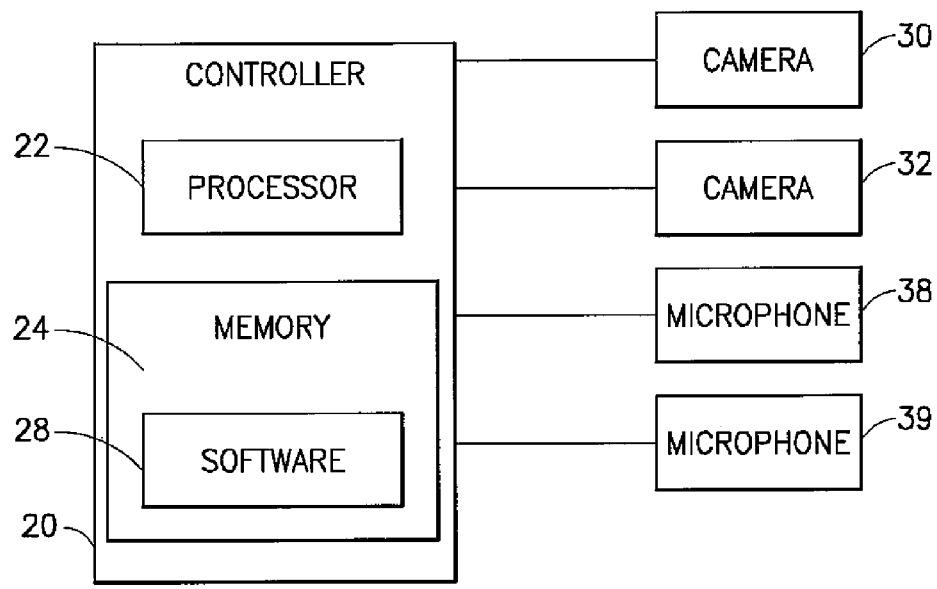
FIG. 3 is a schematic diagram illustrating some of the components of the embodiment shown in FIGS. 1-2.

Referring also to FIGS. 2-3, the apparatus 10, in this example embodiment, comprises a housing 12, a touch-screen 14, a receiver 16, a transmitter 18, a controller 20, a rechargeable battery 26 and at least two cameras 30, 32. However, all of these features are not necessary to implement the features described below. The controller 20 may include at least one processor 22, at least one memory 24, and software 28. The electronic circuitry inside the housing 12 may comprise at least one printed wiring board (PWB) 21 having components such as the controller 20 thereon. The receiver 16 and transmitter 18 form a primary communications system to allow the apparatus 10 to communicate with a wireless telephone system, such as a mobile telephone base station for example.

In this example, the apparatus 10 includes the camera 30 which is located at the rear side 13 of the apparatus, the front camera 32 located at the opposite front side of the apparatus, an LED 34, and a flash system 36. The LED 34 and the flash system 36 are visible at the rear side of the apparatus, and are provided for the camera 30. The cameras 30, 32, the LED and the flash system 36 are connected to the controller 20 such that the controller 20 may control their operation. In an alternate example embodiment the rear side may comprise more than one camera, and/or the front side could comprise more than one camera.

The apparatus 10 includes a sound transducer provided as an earpiece 40, and a sound transducer provided as a speaker 42. More or less than one speaker may be provided. The apparatus 10 includes sound transducer provided as microphones 38, 39. In an alternate example the apparatus may comprise more than two microphones. The microphones 38, 39 are located at respective left and right sides of housing 12 to allow their audio signals to represent left and right channels. However, additional or alternative channels could be provided other than only a left channel and a tight channel. In this example the microphones 38, 39 are located at the bottom of the housing 12, but they could be located at any suitable location on the housing.

Figure 4:
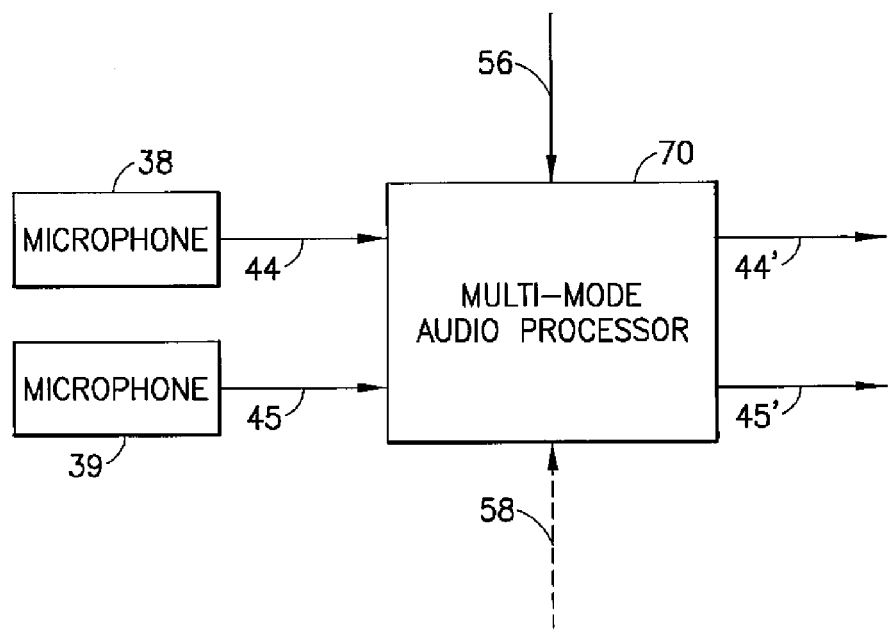
FIG. 4 is a diagram illustrating processing of audio signals from the microphones of the embodiment shown in FIGS. 1-3.

Referring also to FIG. 4, one type of example comprising features will be described. The electronic circuitry of the apparatus 10 is configured to receive signals from the two or more microphones 38, 39 and produce audio signals 44', 45' as left and right output channels. The electronic circuitry of the apparatus 10 forms a multi-mode audio processor 70 for this purposed. The audio processor 70 may use different modes to process the signals 44, 45 and produce different kinds of signals 44', 45'. The mode, which the multi-mode audio processor 70 uses, may be determined or selected based, at least partially, upon which camera 30, 32 is being used.

Speech and ambient sounds often have different relative importance through their varying role in a video call or video recording. How these audio signals are best represented and rendered or captured may depend on the video viewpoint. In one type of example, features as described herein may be used to provide a default audio representation and rendering mode based upon a camera view used. By exploiting multi-microphone spatial capture, an improved separation between the speech and ambient audio signals may be obtained. Thus, it is possible to render the audio with better quality and in a more natural way that better corresponds and adapts to the camera view being used. The rendering may further implement either a mode where the talker is part of the scene, or a novel video call mode where the talker is separated from the overall scene and acts as a narrator.

Sound picked up by microphones, such as during a video call for example, may be separated into audio speech signals and audio ambient signals. It should be understood that these signal types are considered in the scope of both video telephony and video recording. Thus, features as described herein are not limited to video telephony.

When making a video call (or video recording), more than one camera on a device (or as part of the recording system) may be utilized. In particular, for the example shown in FIGS. 1-3, the front-facing camera 32 ordinarily captures the face of the user and the main camera 30 may be used to capture what is in front of the user.

One aspect is to better separate the speech and ambient signals in this framework by exploiting spatial multi-microphone capture and, thus, to allow concentrating on the sounds which can be considered more important in each "use" case. For example, when the front-facing camera 32 is used, the signals emanating from the direct view of the camera can be treated as the main signal which is preserved, while the gain of other signals (the ambience) can be lowered. This can be done because it is expected that the speech signal is the most important signal when the user chooses to show his/her face (as indicated by the selection of the use of the camera 32). On the other hand, all sound sources (including the talker who is now most probably behind the device 10) can be expected to be of interest when the main camera 30 is used.

With features as described herein, the utilization of either the front-facing camera 32 or the main camera 30 in a video call may be used to trigger the preferred capture mode based upon the camera being used. The utilization of a specific camera may additionally trigger the default setting of a capture mode. In one type of example embodiment the default setting of a capture mode may then also be adjusted by the user.

Referring back to FIG. 4, the audio processor 70 is configured to control the level of the ambience signal in the output signal based on the camera used. This may also possibly be based on voice activity detection (VAD) or face detection. Thus, features as described herein may be used to automatically allow for improved fidelity of the speech signal coding (when the front-facing camera 32 is used) and a different adaptation to coding speech and ambient signals, such as at a same level for example, when the user uses or switches to the main camera 30.

Figure 5:
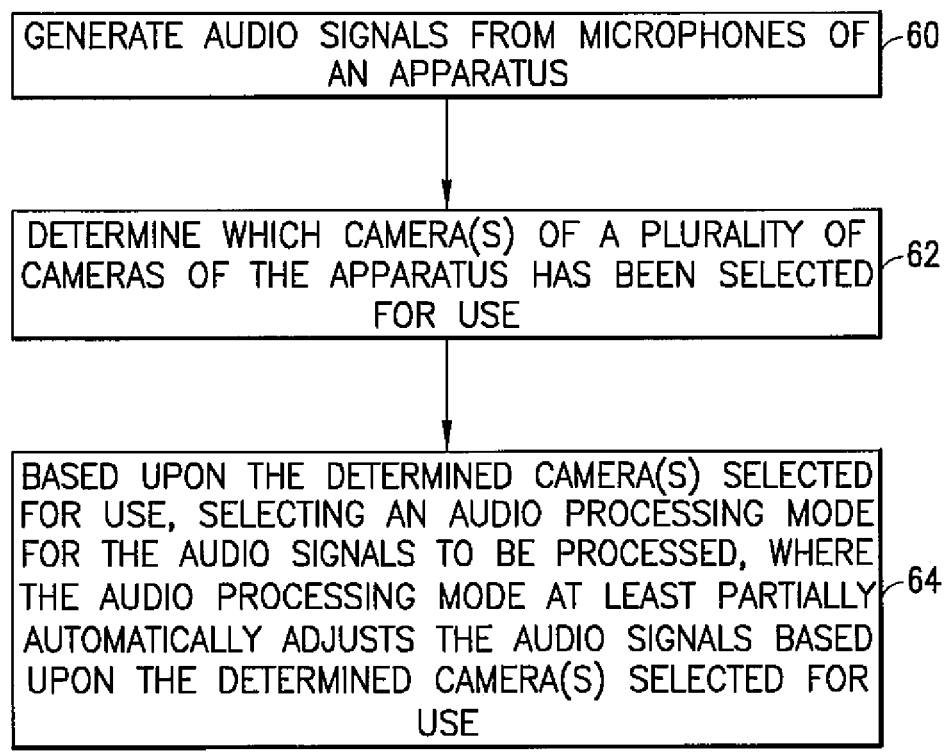
FIG. 5 is a diagram illustrating an example method.

Referring also to FIG. 5, an example method may comprise generating audio signals from microphones of an apparatus as indicated by block 60; determining which camera(s) of a plurality of cameras of the apparatus has been selected for use as indicated by block 62; and based upon the determined camera(s) selected for use, selecting an audio processing mode for the audio signals to be processed, where the audio processing mode at least partially automatically adjusts the audio signals based upon the determined camera(s) selected for use as indicated by block 64. Generating of the audio signals is referring to audio capture/recording where electrical output signals of the microphones are processed.

As noted above, a face tracking method may be utilized to further enhance the adaptation of the capture to real-world scenarios. For example, face detection information may be provided by signal 58 shown in FIG. 4. In one example, when the face of the talker cannot be found in the view of the front-facing camera 32, the ambient gain of sound sources in front of the device (but not in view) might not be lowered. Such a sound source may, in fact, be the talker. The presence of a speech signal may additionally or alternatively be detected by using voice activity detection (VAD) or similar techniques as noted above.

Figure 6:
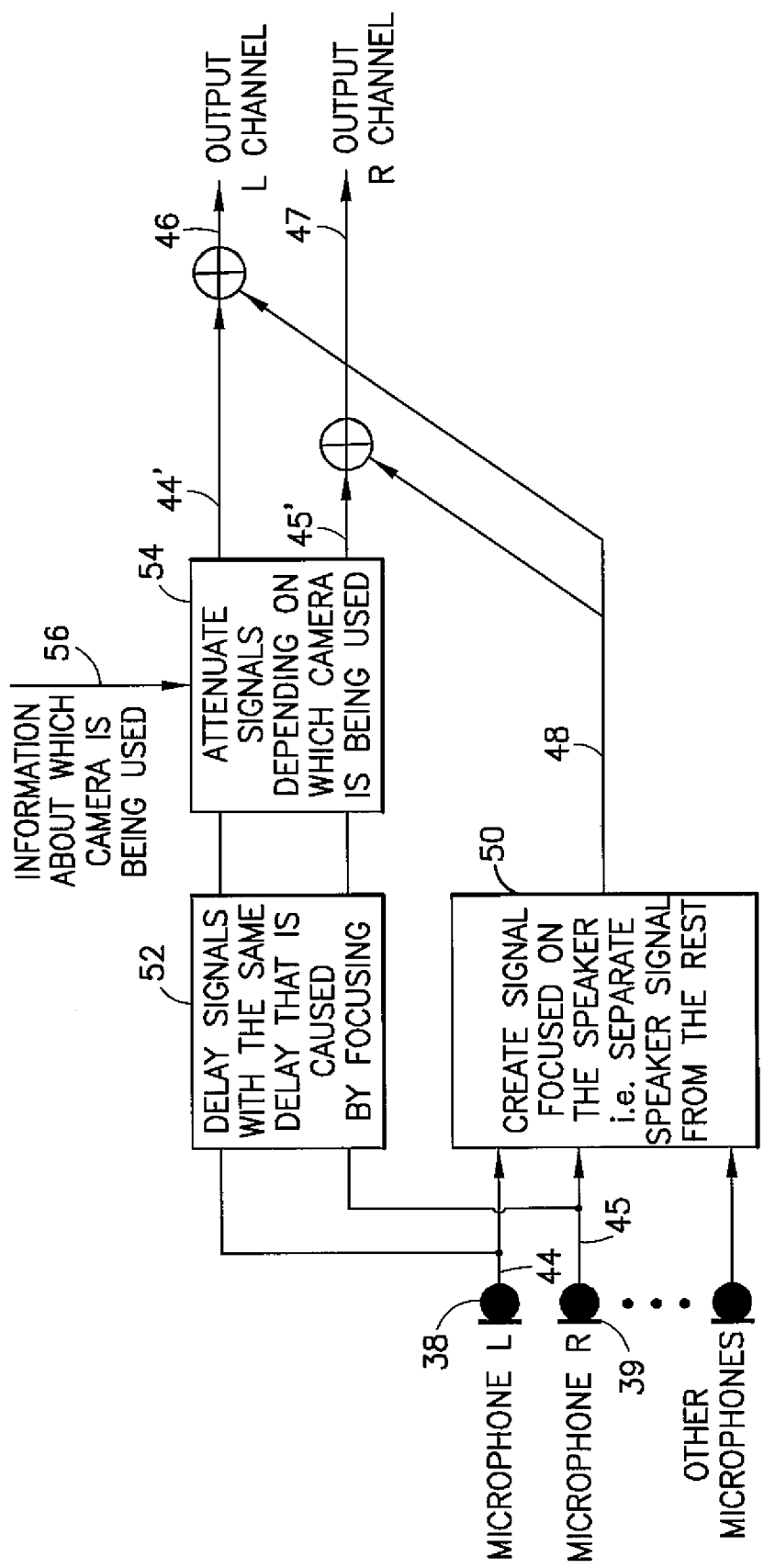
FIG. 6 is a diagram illustrating processing of audio signals from the microphones of the embodiment shown in FIGS. 1-3.

Referring also to FIG. 6, another example embodiment will be described which may be used for a more concrete separation of the talker (the main speech signal) and the ambient signals. A use case for this approach could be described as "lifting the talker out" of the overall scene and using him/her as a narrator. In this case, the orientation of the talker follows the orientation of the video footage when the switch is made between the front-facing camera 32 and the device main camera 30. Indeed this may be considered a natural and preferred way of rendering when the talker is considered as part of the ambience, and the listener wants to experience the scene like being there. However, we are accustomed also to another type of rendering which applies itself well to video telephony. A typical example would be a TV news presentation (or a program such as a nature document) that involves showing the head of a person talking (talking heads) and other video footage where the talker only appears as a narrator rather than an element of the overall scene. This scenario lends itself quite naturally to video telephony, and a monaural audio rendering (which is currently the typical audio technology in video calls) may also be considered to follow this principle: the position of the talker remains more or less fixed when the view in the video footage changes.

One of the cameras is typically mainly used to capture the speaker (front camera 32) and other camera(s) are used to capture the landscape (rear camera 30). The voice from the speaker is, therefore, linked to the front camera 32 and the ambience sound is linked to the rear camera 30. Therefore, it would be good, if the spatial image of the speaker's voice would correspond to the video when the front camera is used and the spatial image of the ambience would correspond to the video when the rear camera is used.

In this example embodiment, spatial multi-microphone capture is used to separate between signals on each side of the device. At least, the sounds and sound sources relating to the front-facing camera side and the device main camera side are separated. Further, the main speech signal is separated from the front-facing camera side ambient signals. Audio and video processing methods such as VAD, noise suppression, face tracking, beamforming, audio object separation, etc. can be utilized.

The left and right microphones 38, 39 are placed on the device to correctly capture audio for one camera, i.e., on the left and right sides of the camera respectively. In one type of example a mono signal focused on the speaker(s) is created. In an alternate type of example a stereo signal focused on the speaker(s) is created. In this example the signals 44, 45 from the microphones are used to create a mono signal (or stereo signals) 48 by the circuitry 50. This may comprise, for example, use of the apparatus and method described in International Application No. PCT/IB2013/052690 (International Publication No. WO 2014/162171 A1) which is hereby incorporated by reference in its entirety, which creates a mono signal focused on a person speaking; as captured by a camera. However, any suitable system to separate speech from ambient sound may be provided.

The audio signals 44, 45, delayed by circuitry 52, is then attenuated by circuitry 54. The controller 20 is configured to determine which camera 30 or 32 is being used during the creation of the signals 44, 45, and send a camera indication signal 56 to the circuitry 54. The circuitry 54 is configured to provide two or more audio processing modes for the signals 44, 45. The selection of the audio processing mode is based, at least partially, on the camera indication signal 56. Thus, the circuitry 54 is configured to vary attenuation of the signals 44, 45 based upon which camera 30, 32 is being used. The output signals 44', 45' are then combined with the mono signal(s) 48 to produce the output signals 46, 47.

The level of the ambience signals exiting the circuitry 54 is varied depending on the used camera, and the ambience signal is mixed with the focused speech signal. When the camera facing the speaker(s) (typically front camera 32) is used, the speech signal spatial image remains constant, the speech spatial image is consistent with the video (taken by the front camera 32), and the ambience signal spatial image may be attenuated. When a camera that faces away from the speaker (typically rear camera 30) is used, the ambience signal spatial image remains constant, the ambience spatial image is consistent with the video, and the speech signal spatial image remains constant (or may be attenuated less than the ambience signals in the above mode).

In some further example embodiments, a stereo-channel or directional reversal of a signal may be done when the view is switched between the at least two camera views. For example, such a reversal (see FIGS. 16 and 17) may be made such as by narrowing the separation between the channels (all the way to a mono signal) and then expanding the separation back to full stereo (where the left and right channel are now reversed).

Figure 7:
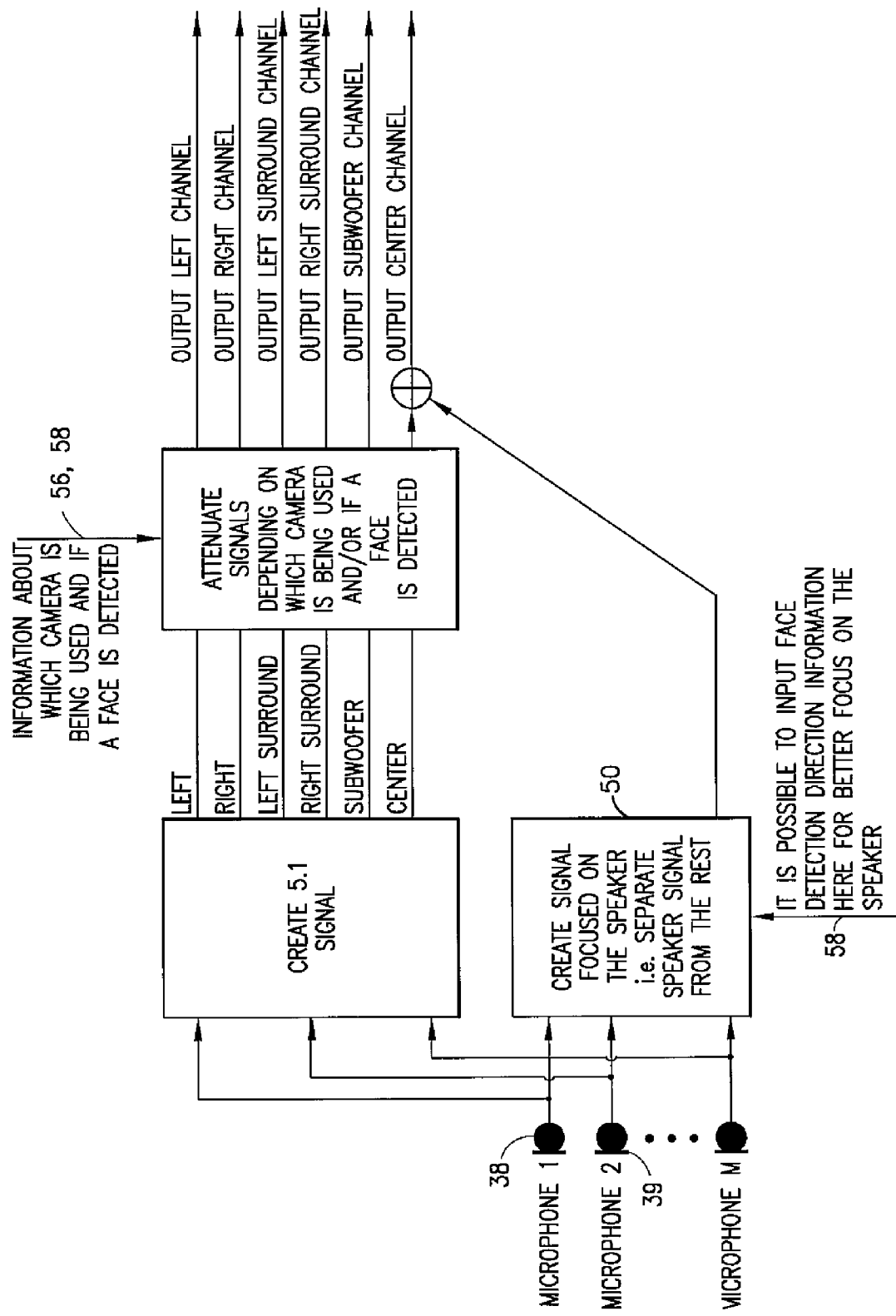
FIG. 7 is a diagram illustrating processing of audio signals from the microphones of the embodiment shown in FIGS. 1-3.

Referring also to FIG. 7, it is also possible to extent the implementation to more than two channels. For example, the speaker sound could be captured using multi-microphone techniques that focus on his/her voice regardless of the used camera, and the ambience could be captured using multi-microphone techniques that create 5.1 sound. The 5.1 capture could be aligned fixed to the direction of one of the cameras; typically the main camera 30 at the back side of a mobile device. This camera 30 is typically used when the speaker wants to show a landscape, or view in front of the user, etc. The two signals, ambient and voice, may then be mixed together in a way that depends on the used camera, and if the speaker's head is visible in the camera 30 or 32. Typically, when the speaker is visible in the camera 30 or 32 the ambience signal is attenuated.

In some embodiments, the video footage may exploit picture-in-picture (PIP) rendering. In such case, the separation of the speech and ambient audio and maintaining a static orientation for the talker often provides a pleasant rendering. Thus, the PIP use case may work the same as the "narrator" mode discussed above. In some further embodiments, the audio mode may adapt to changes in the picture-in-picture video. In particular, when the main camera provides the main picture and the secondary (PIP) picture comes from the front-facing camera, the case is similar to using the "narrator" mode with only the main camera view. On the other hand, when the main picture and PIP are reversed, the default operation may be to at least slightly attenuate the spatial ambient sound. In yet further embodiments, the stereo or multi-channel rendering of the speech signal may be downmixed to mono when picture-in-picture video is shown. This is especially the case when the PIP video comes from the front-facing camera.

In various example embodiments, the device orientation (portrait, landscape) may result in a selection of the microphones corresponding to the left and right signal. This follows from the fact that a different set or pair of microphones correspond to the left and right; depending on device orientation.

Figure 8:
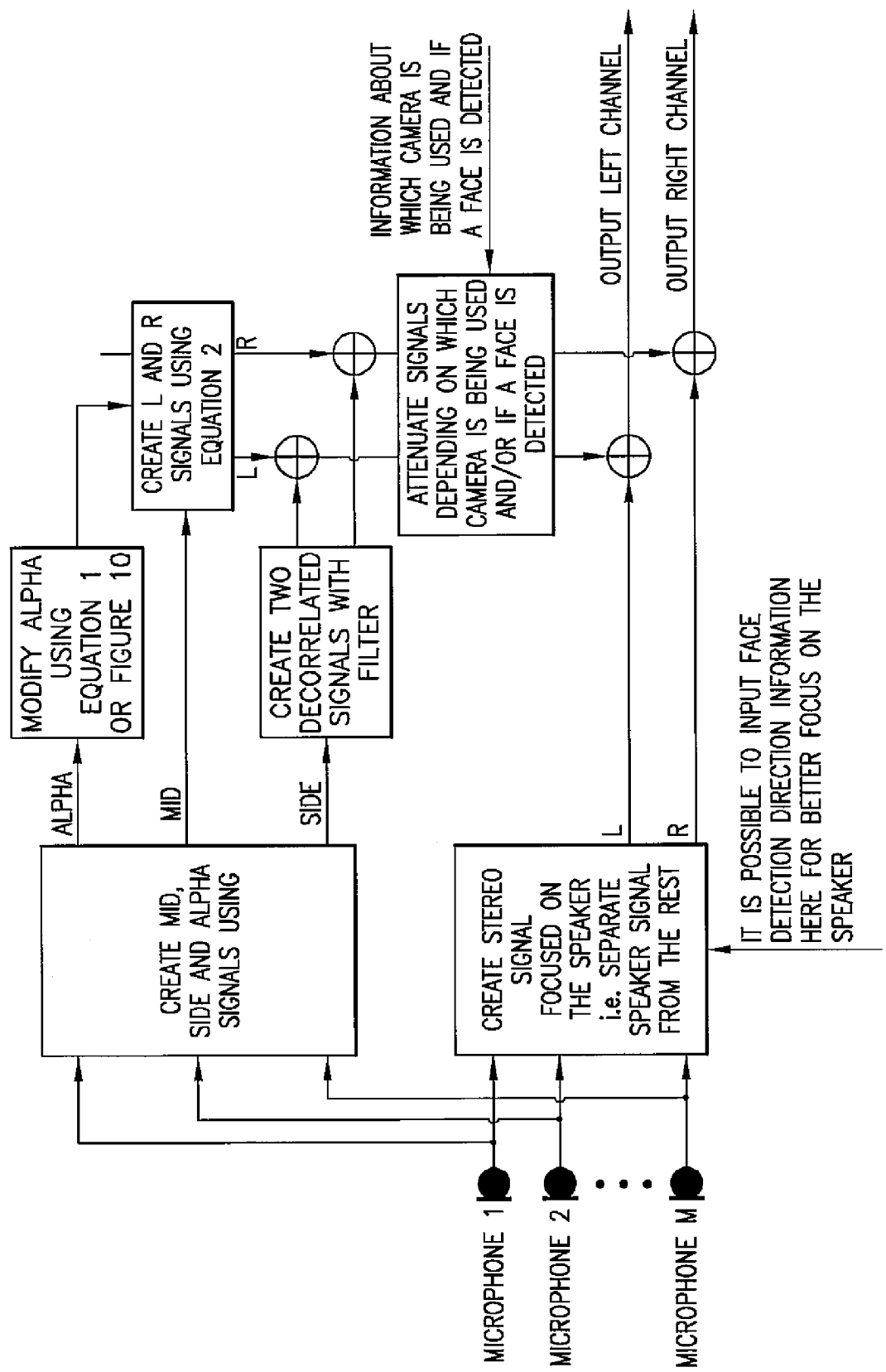
FIG. 8 is a diagram illustrating processing of audio signals from the microphones of the embodiment shown in FIGS. 1-3.
Figure 9:
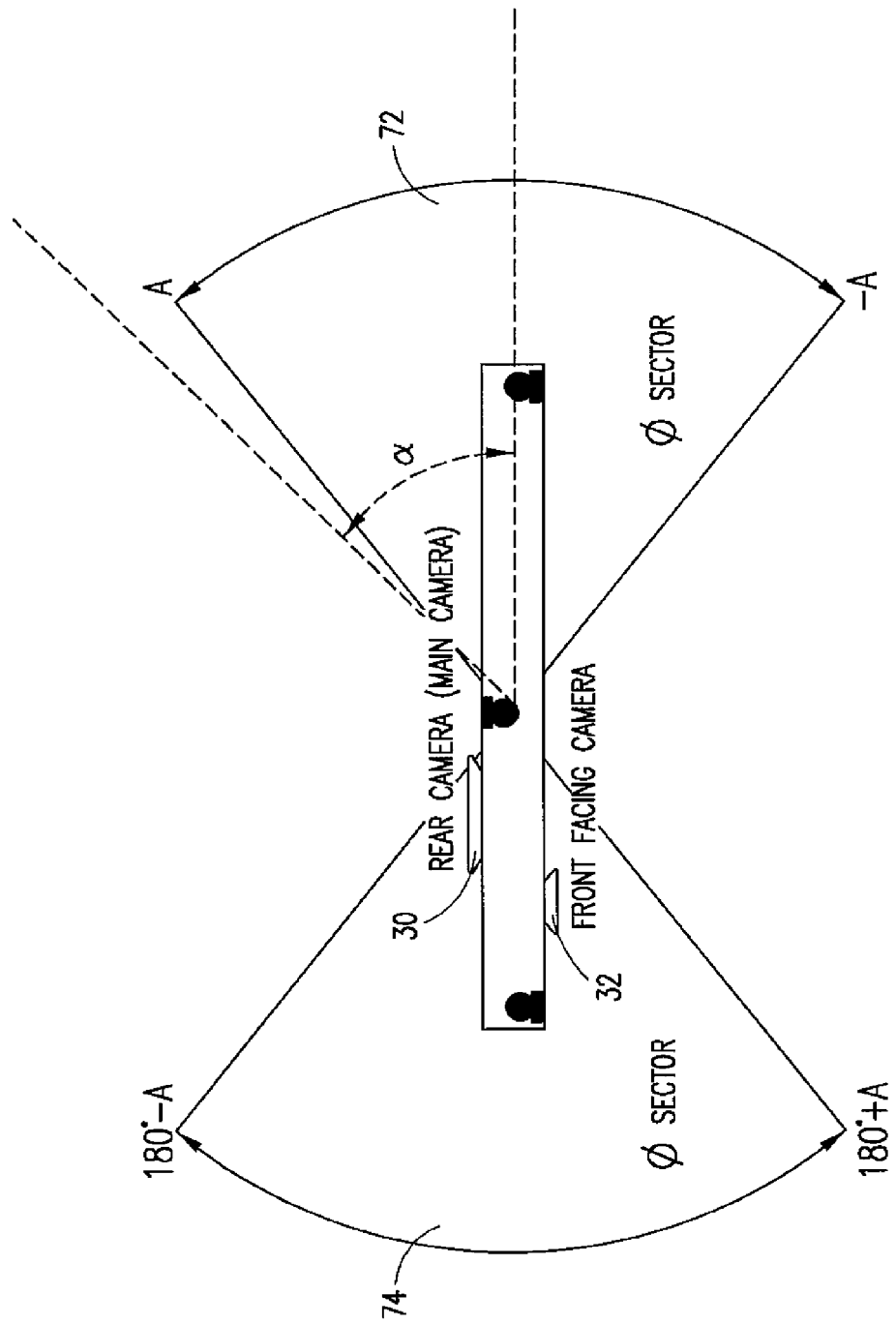
FIG. 9 is a diagram illustrating areas relative to the apparatus shown in FIGS. 1-2 where audio source directions may be modified.

Referring also to FIGS. 8-9, it is also possible to modify the audio signals so that the audio source directions (spatial image) and the video are always consistent. This works as long as there are gaps 72, 74 in between the areas that the cameras 30, 32 can see, and when moving audio source directions fall to these gaps; the direction can be changed. Of course, the audio source direction can also be changed when the source is visible in a camera, but that causes an inconsistency between the spatial image and the video. In a typical scenario, the directions of ambient audio sources would be modified; the speaker typically moves less and remains in the view of one camera only.

Features as described herein may use capturing 5.1 signals using only 3 microphones in a mobile device such as described in U.S. patent publication No. US 2013/0044884 A1 which is hereby incorporated by reference in its entirety. It is also possible to use different panning functions for different outputs. In this embodiment (referring to FIG. 8) stereo audio is used. This embodiment (referring to FIG. 8) would not work with 5.1 audio because the playback direction of audio objects would need to switch from back to front when the camera is switched (from front facing camera to main camera or vice versa). The signals captured by the 3 microphones are firstly converted into Mid and Side signals together with side information alpha. Alpha $\alpha_b$ describes the dominant sound direction for each frequency band b. In order to create an audio signal, where the sound image remains static even when the user switches between the front and the rear camera, alpha may be modified in the following way (band index b is omitted for the sake of simplicity):

$$\hat{\alpha} = \begin{cases} \alpha, & A < \alpha \leq 180° - A \\ \emptyset, & 180° - A < \alpha \leq 180° + A \\ 180° - \alpha, & 180° + A < \alpha \leq -A \\ \emptyset, & -A < \alpha \leq A \end{cases} \quad (1)$$

This results in the audio source directions, that fall into the areas 72, 74 in FIG. 9, being modified.

Objects directly to the left and right may be played back from both left and right; therefore they are given direction ø that is the notation for unknown direction. The area for the unknown direction sector is $-A<\alpha<<A$ and $180°-A<\alpha<<180°+A$. A is typically 45°, however, other values for A may also be used, such as when different panning laws are used for example. One example of a panning law that can be used, in particular if A=45°, is the well known sine-cosine panning law. Mid channel panned to Left and Right output channels is then:

$$L^b = \cos(\hat{\alpha}_b) M^b$$

$$R^b = \cos(\hat{\alpha}_b) M^b \quad (2)$$

After this the decorrelated Side signal is added to both Left and Right channel, which are transmitted and played back.

Figure 11:
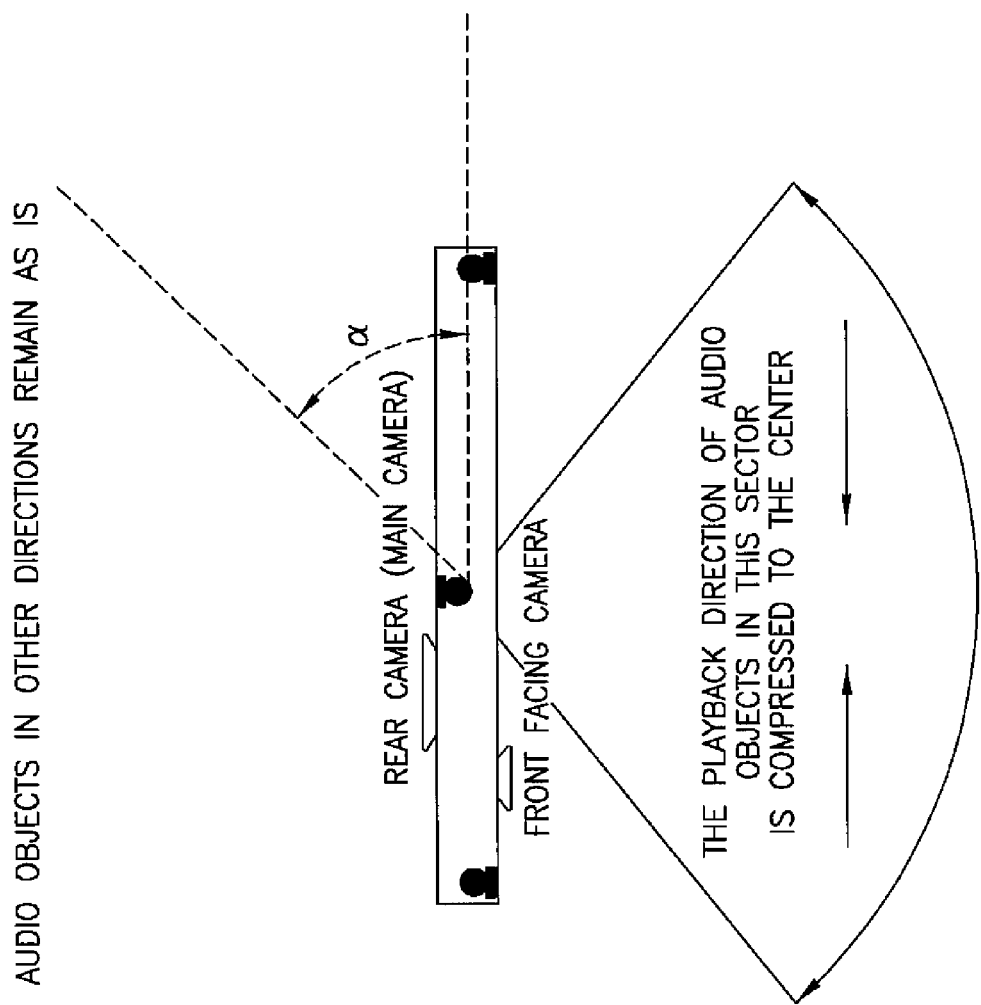
FIG. 11 is a diagram illustrating making a spatial image stationary on one side of the apparatus shown in FIGS. 1-2.

With the example described above, audio objects directly to the left or right of the device need to be played back from both left and right; otherwise the playback direction of those audio objects will switch places when the camera is switched. This is not a big problem, since those objects are not visible in either camera. Referring also to FIG. 11, alternatively it is possible to focus on making the spatial audio image stationary on one side of the camera (in front of or behind) while letting the playback direction of audio objects on the three other sides switch from left to right and vice versa when the camera is switched. This can be achieved by compressing the audio object playback locations to one point on one side of the camera while keeping the locations "as is" on the other sides.

Figure 10:
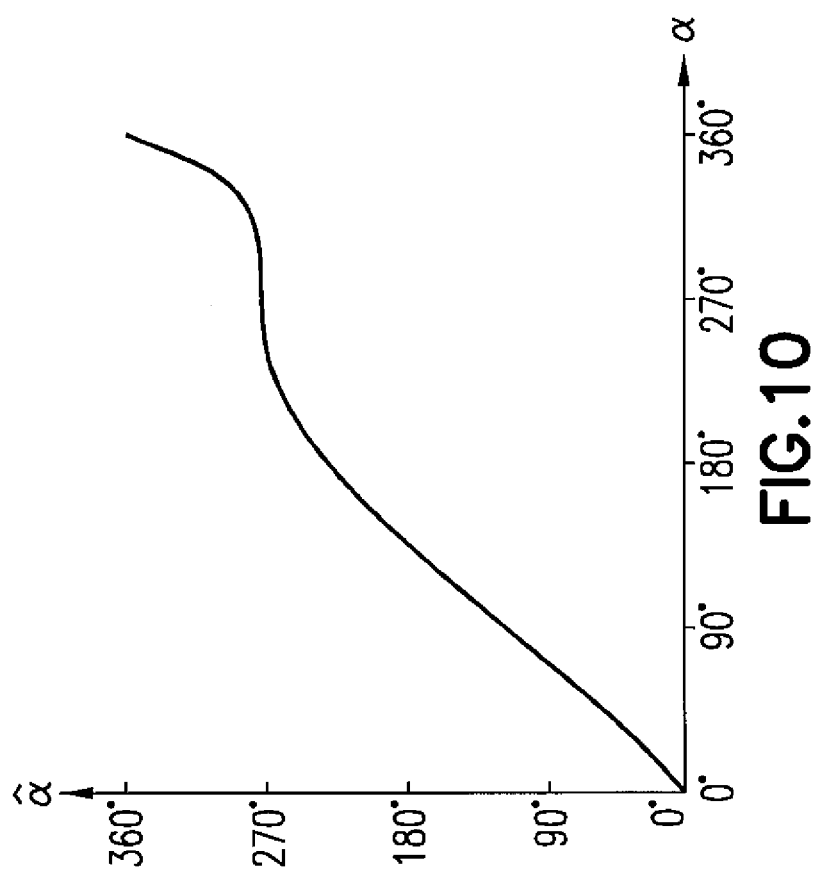
FIG. 10 is a diagram illustrating an example graph for modification of audio source directions.

In practice, this would usually be done so that on the front facing camera side all audio objects that are visible in the front facing camera would have their audio always played back from the center. Usually, there is only the person on the front facing camera side, thus, compressing the direction of his voice to the center is natural. Audio objects on other sides of the device would then be played back from the direction that corresponds to the directions seen on the rear camera. This can be done by replacing Formula 1 with modifying a with the function illustrated in FIG. 10; while keeping other processing as in FIG. 8. FIG. 10 is a curve depicting the modification of a.

Figure 12:
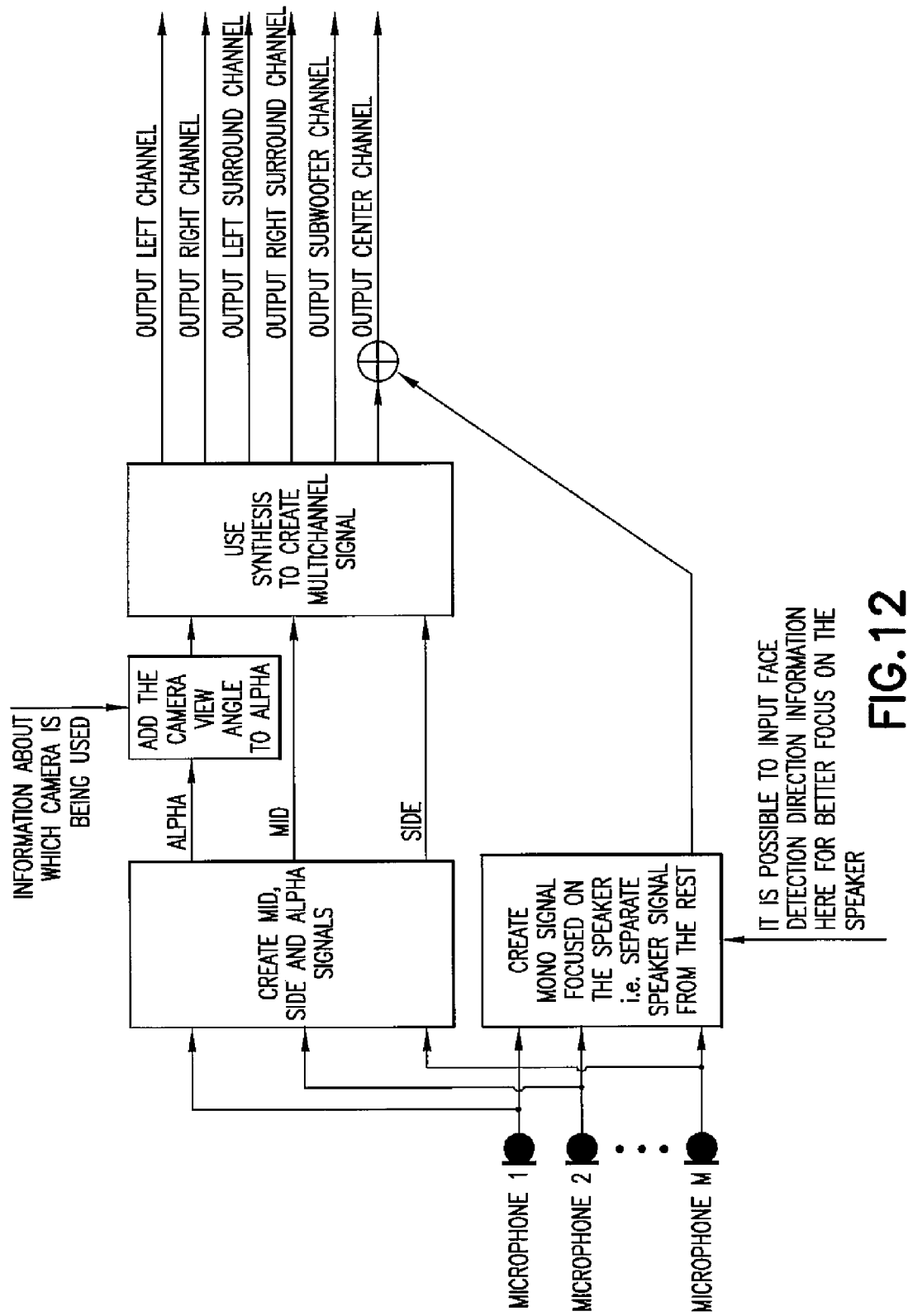
FIG. 12 is a diagram illustrating processing of audio signals from the microphones of the embodiment shown in FIGS. 1-3.

Referring also to FIG. 12, an alternative example is to rotate the auditory spatial image slowly when camera use is switched between or among cameras. For example, a user first takes a video with a first camera, and the audio spatial image is consistent with the first camera. The user then switches to a second camera. After the switch the audio spatial image is (slowly) rotated until it becomes consistent with the second camera.

Figure 13:
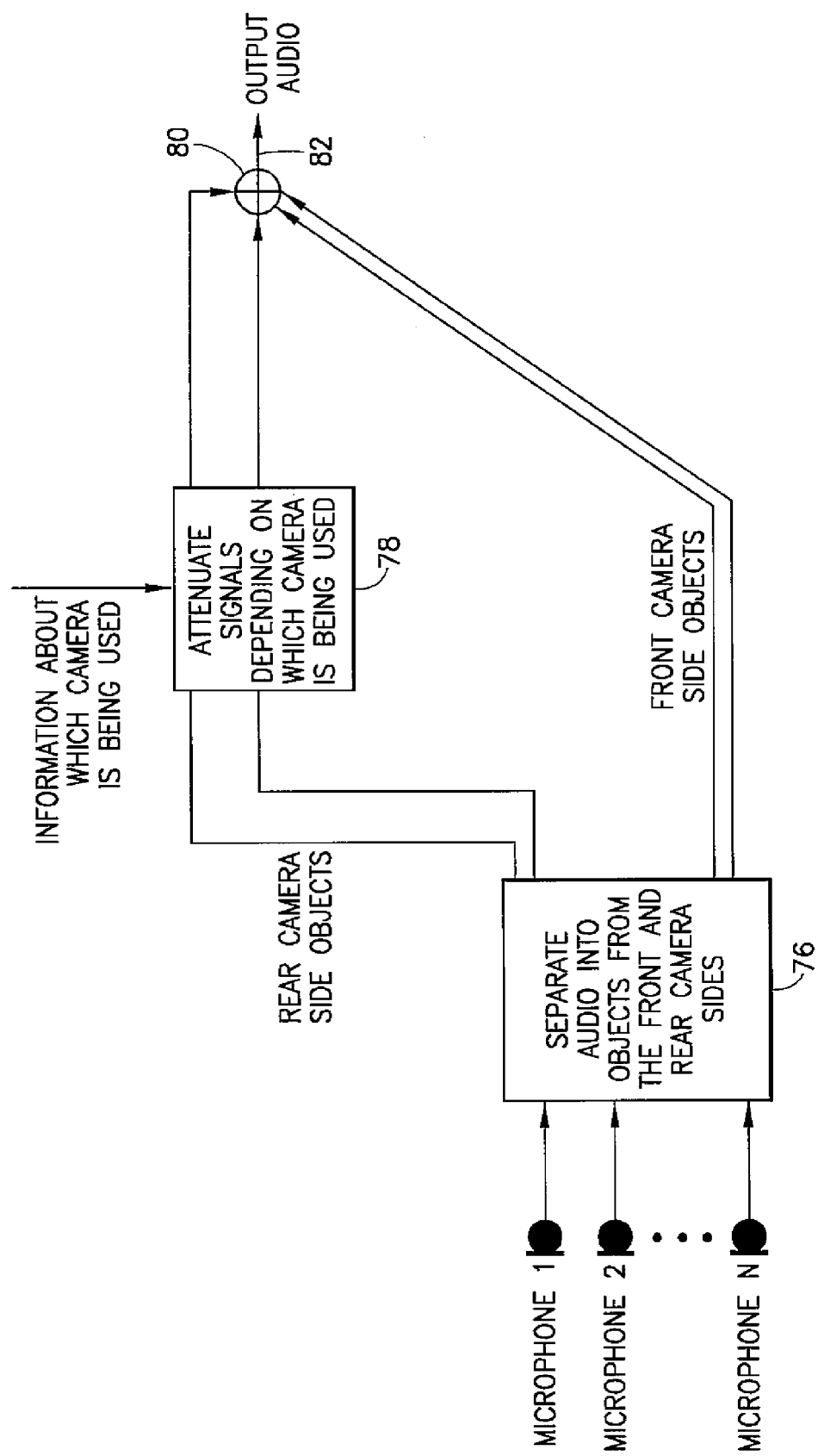
FIG. 13 is a diagram illustrating processing of audio signals from the microphones of the embodiment shown in FIGS. 1-3.
Figure 14:
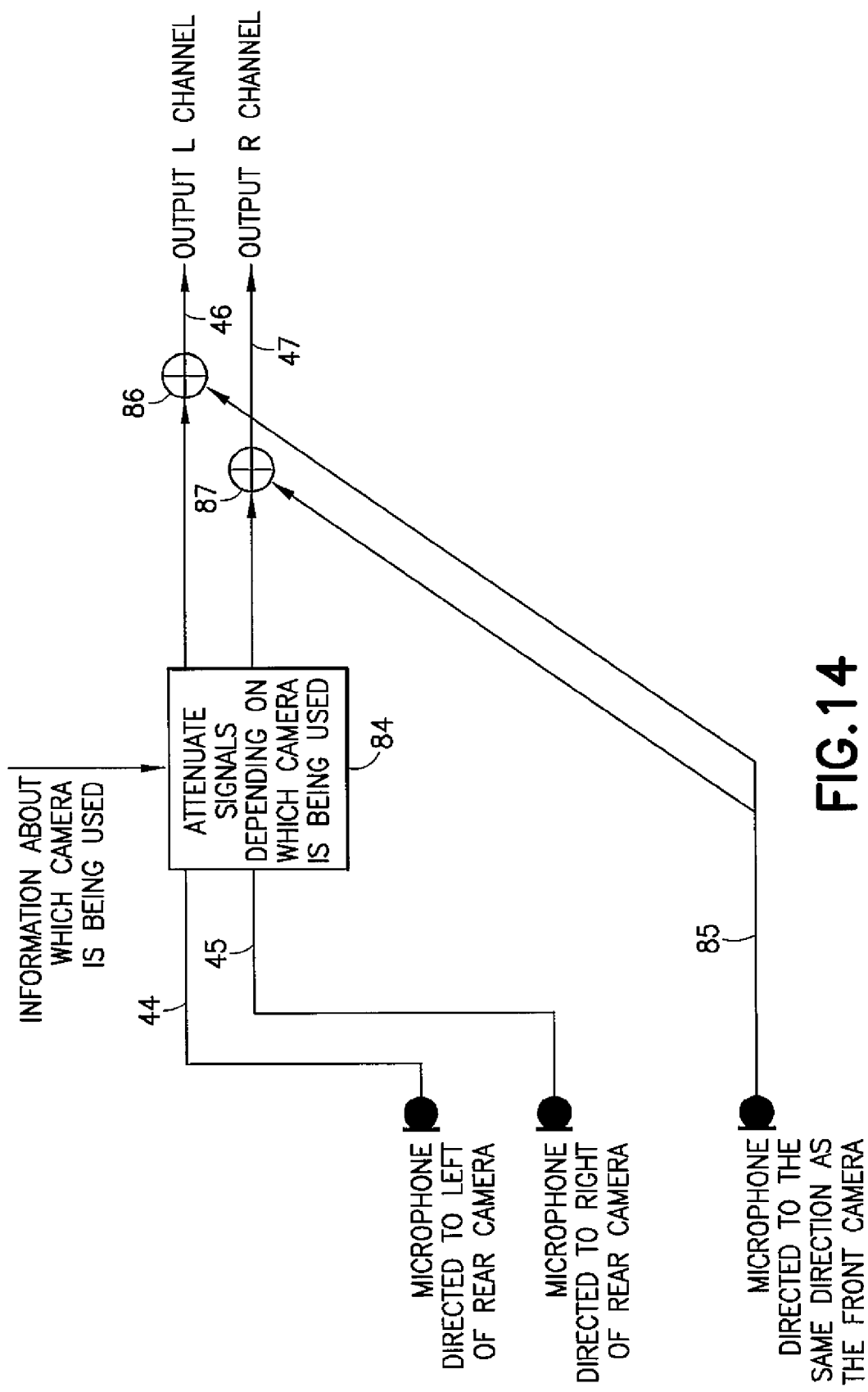
FIG. 14 is a diagram illustrating processing of audio signals from the microphones of the embodiment shown in FIGS. 1-3 with another microphone.

The above described examples have focused on devices that have two cameras. However, features as described herein may easily be extended to an apparatus having more than two cameras. The cameras do not need to be in a single plane. The same principles as presented here may be used for cameras that are not on a single plane. Alternative embodiments here are not limited to mobile phones. Any device with two or more cameras can be used. It is possible to add means for audio object separation or directional microphones to separate the speech and ambient objects. For example, similar to the embodiment described above with regard to FIG. 6, features could be implemented in the following two ways with regard to FIGS. 13 and 14. FIG. 13 shows using audio object separation. Audio is separated into objects from the front and rear cameras as indicated by block 76, objects from the side of the rear camera 30 may be attenuated as indicated at block 78 depending upon which camera is being used, and signals can be combined 80 for an output audio 82. FIG. 14 shows using directional microphones. Signals 44, 45 from the microphones directed to the left and right of the rear camera may be attenuated as indicated by block 84 based upon which camera is being used, and signals 85 from a microphone directed to the same direction as the front camera 32 may be combined 86, 87 with the signals output from 84 to generate the output left and right channels 46, 47.

Figure 15:
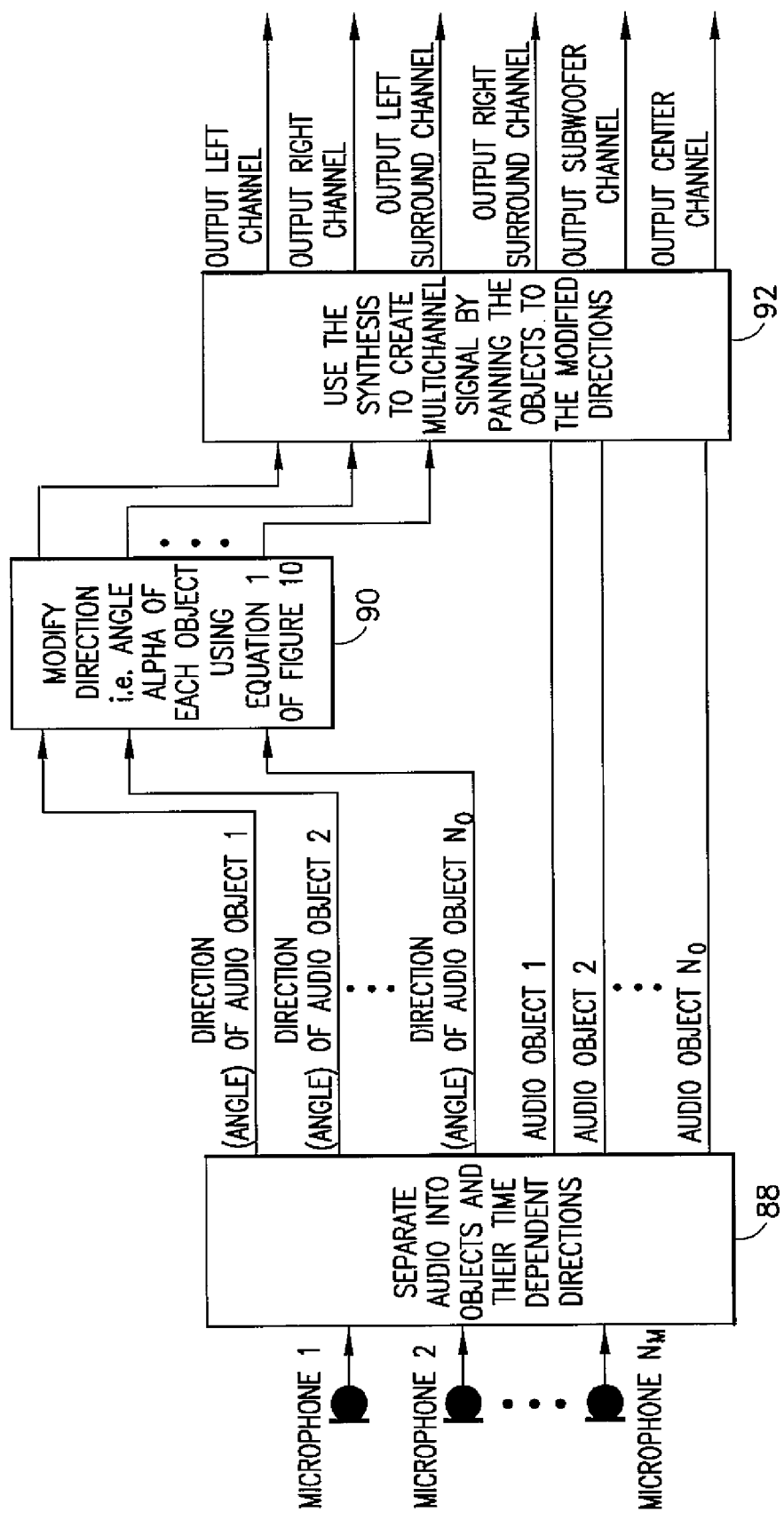
FIG. 15 is a diagram illustrating processing of audio signals from the microphones.

Audio object separation can also be used to implement embodiments similar to that described above with respect to FIGS. 8-11. A method may be used to convert a multi-microphone signal into audio objects and their trajectories. The trajectories are the time dependent directions of each object. The direction is typically indicated as an angle (or two angles, azimuth and elevation, in case of full 3D trajectories) with respect to the device. The angle of each object can then be modified using Formula 1 or FIG. 10. See FIG. 15 for an example block diagram of this implementation. Signals from the microphones can be separated into objects and their time dependent directions as indicated by block 88, such as use of features as described in International patent publication No. WO 2014/147442 A1 for example, which is hereby incorporated by reference in its entirety. The direction of some of the signals output from 88 may be modified as indicated by block 90. A synthesis, as indicated by block 92, may be used to create multichannel signals by panning the objects to the modified directions, such as described in R. Sadek, C. Kyriakakis: "A Novel Multichannel Panning Method for Standard and Arbitrary Loudspeaker Configurations", AES 117th Convention, 2004 Oct. 28-31, San Francisco, Calif., USA for example.

Features as described herein may be used for an automatic adaptation of a coding mode based on camera selection to improve the quality and focus on relevant signals. A new use case for video telephony may be provided where the talker/speaker/user acts as a narrator instead of being part of the overall scene. Features as described herein may be used for video telephony, spatial audio capture, audio processing, coding, and rendering.

In conventional movies, when the camera angle or viewpoint changes, only the position of the audio sources that are visible on the screen change. The audio sources that are not visible on the screen do not change their direction when the camera viewpoint changes. Features as described herein can change the direction/position of the audio sources that are not visible on the screen/display. In conventional movie production, many different methods are used to keep the audio source locations constant and still matching to video when camera viewpoint is changed. However, these methods are purely manual and done separately during post-processing.

Low bit rate speech coding has traditionally concentrated on passing an intelligible speech signal from the talker to the listener. One practical implication of this target is that all signals, other than the active speech, are considered noise that can be suppressed or removed. However, in high-quality services, the idea is increasingly often to consider most other signals as ambient information wanted to reproduce for the listener (although the idea of maintaining the intelligibility of the speech signal is certainly as relevant as in low bit rate applications). The highest priority is thus speech, but the ambient signals are also of interest. In fact, in some cases their importance may surpass the importance of the speech signal; at least momentarily.

When video is recorded (and possibly transmitted in a video call) with a mobile device with more than one camera, the user may change the camera during recording. This conventionally changes the viewpoint of the camera, but it does not change the location of the microphones. Therefore, with conventional devices there is a discrepancy between the audio source locations and the video in at least one of the viewpoints. A first simple solution would keep the audio source locations (i.e. audio spatial image) fixed to one camera, but that would mean that the spatial image would be wrong for all other cameras. A second simple solution would reassign the used microphones differently for each camera, but that would result in an annoying change in the audio signal every time the used camera is changed. Features as described herein propose several methods to improve the situation.

Figure 16:
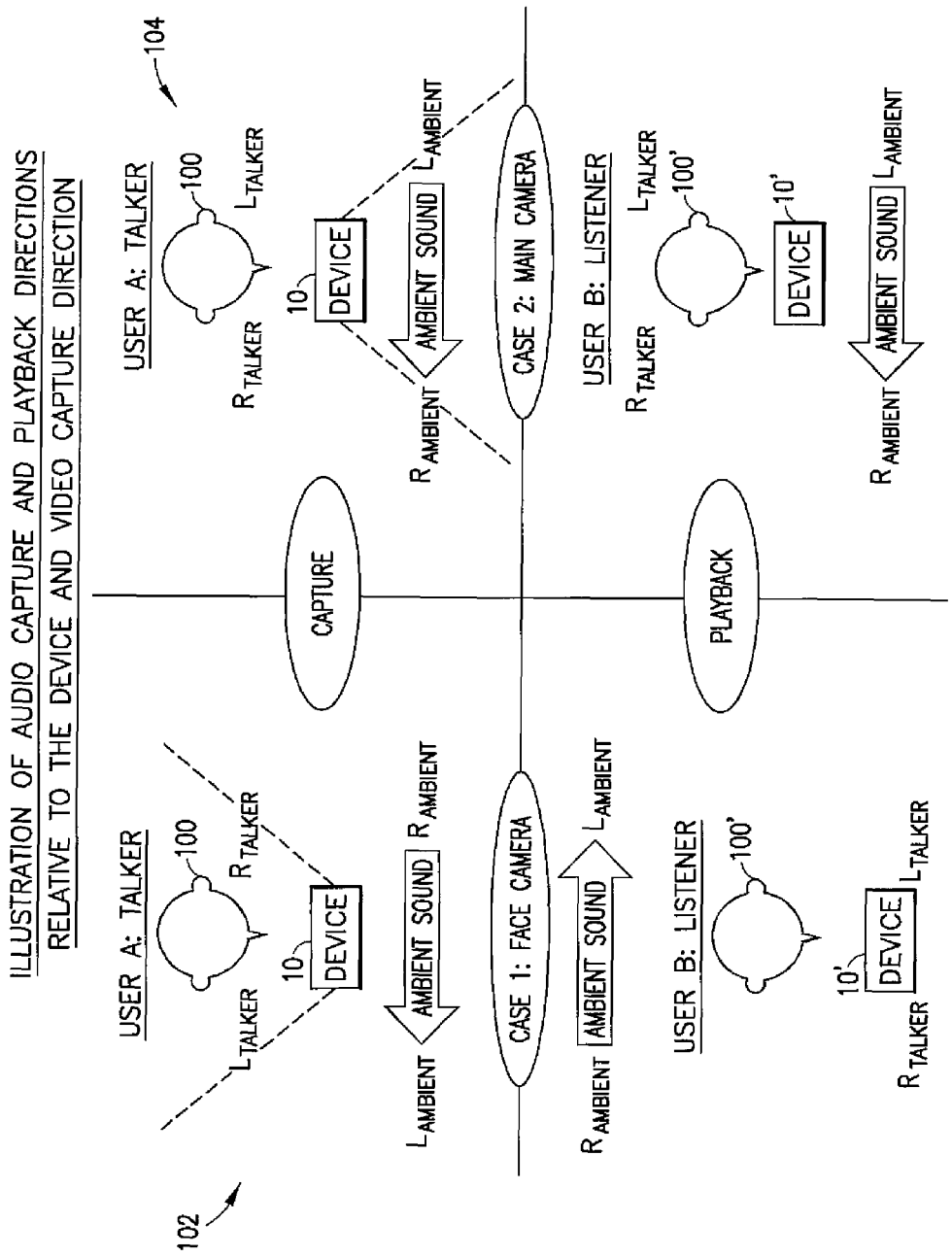
FIG. 16 is a diagram illustrating an example use of audio capture and playback directions relative to the apparatus shown in FIGS. 1-2 and the video capture direction.

Referring also to FIG. 16, diagrams are shown to help visualize some of the features as described herein. As noted above, audio sound during a video call or video recording can be separated into speech and ambient signals. When making a video call or recording, more than one camera on a device 10 (or as part of the recording system) is often utilized. A front-facing camera 32 may capture the face of the user 100, and a main camera 30 may be used to capture most of what the user sees while using the device, during a (mobile) call for example. FIG. 16 illustrates on a conceptual and simplified level how the talker/speaker signals from the talker 100 and the ambient signals may be captured by the two microphones 38, 39 shown in FIG. 1, and then rendered (playback) in such a system (where better than mono recording and rendering as well as headphone listening is assumed) to the user 100' (who may be the same person 100 or a different person(s), perhaps using a different device 10' such as during a video call). An even simpler system would not adapt at all to the change of camera view.

As can be seen in FIG. 16, the talker 100 is always considered as part of the overall scene/ambience regardless of whether the front-facing camera is being used as indicated by diagram area 102 or the device main camera is used as indicated by diagram area 104. Thus, left is left and right is right for all sound (talker and ambient) captured by the microphones, only the position during playback of the talker and ambient signal appears to change (in a natural way) in relation to the listener 100'.

One aspect is to better separate the speech and ambient signals in this framework by exploiting spatial multi-microphone capture and, thus, to allow concentrating on the sounds which can be considered more important in each use case. Thus, when the front-facing camera is used as indicated by 102, the signals emanating from the direct view of the camera can be treated as the main signal which is preserved, while the gain of other signals (the ambience) can be lowered. This can be done, because it is expected that the speech signal is the most important signal when the user chooses to show his/her face. On the other hand, all sound sources (including the talker who is now most probably behind the device) can be expected to be of interest when the main camera is used to show the overall scene as indicated by 104.

For example the techniques described in PCT publication No. WO 2013/093187 A2, which is hereby incorporated by reference in its entirety, can be utilized to achieve the above separation. However, as described herein the utilization of either the front-facing camera or the main camera in a video call can be used to trigger a preferred audio capture mode from a plurality of modes. In more general terms, the utilization of a specific camera may trigger a default setting of a capture mode, which can optionally then be adjusted by the user. In addition, face tracking methods may be utilized to further enhance the adaptation of the capture to real-world scenarios. In particular, when the face of the talker cannot be found in the view of the front-facing camera, the ambient gain of sound sources in front of the device (but not in view) might not be lowered. Such a sound source may in fact be the talker. The presence of a speech signal may further be detected, e.g., by using voice activity detection (VAD) or similar techniques.

Thus, embodiments may automatically allow for improved fidelity of the speech signal coding (when front-facing camera is used) and adaptation to coding speech and ambient signals at the same level (when user switches to main camera).

As noted above with respect to claim 6, one type of embodiment allows for a more concrete separation of the talker (the main speech signal) and the ambient signals. As was seen in FIG. 16, the orientation of the talker follows the orientation of the video footage when the switch is made between the front-facing camera as illustrated by 102 and the device main camera as illustrated by 104. Indeed this may be considered a natural and preferred way of rendering when the talker is considered as part of the ambience and the listener wants to experience the scene like being there.

In this embodiment, spatial multi-microphone capture may be used to separate between signals on each side of the device. At least, the sounds and sound sources relating to the front-facing camera side and the device main camera side may be separated. Further, the main speech signal may be separated from the front-facing camera side ambient signals.

Figure 17:
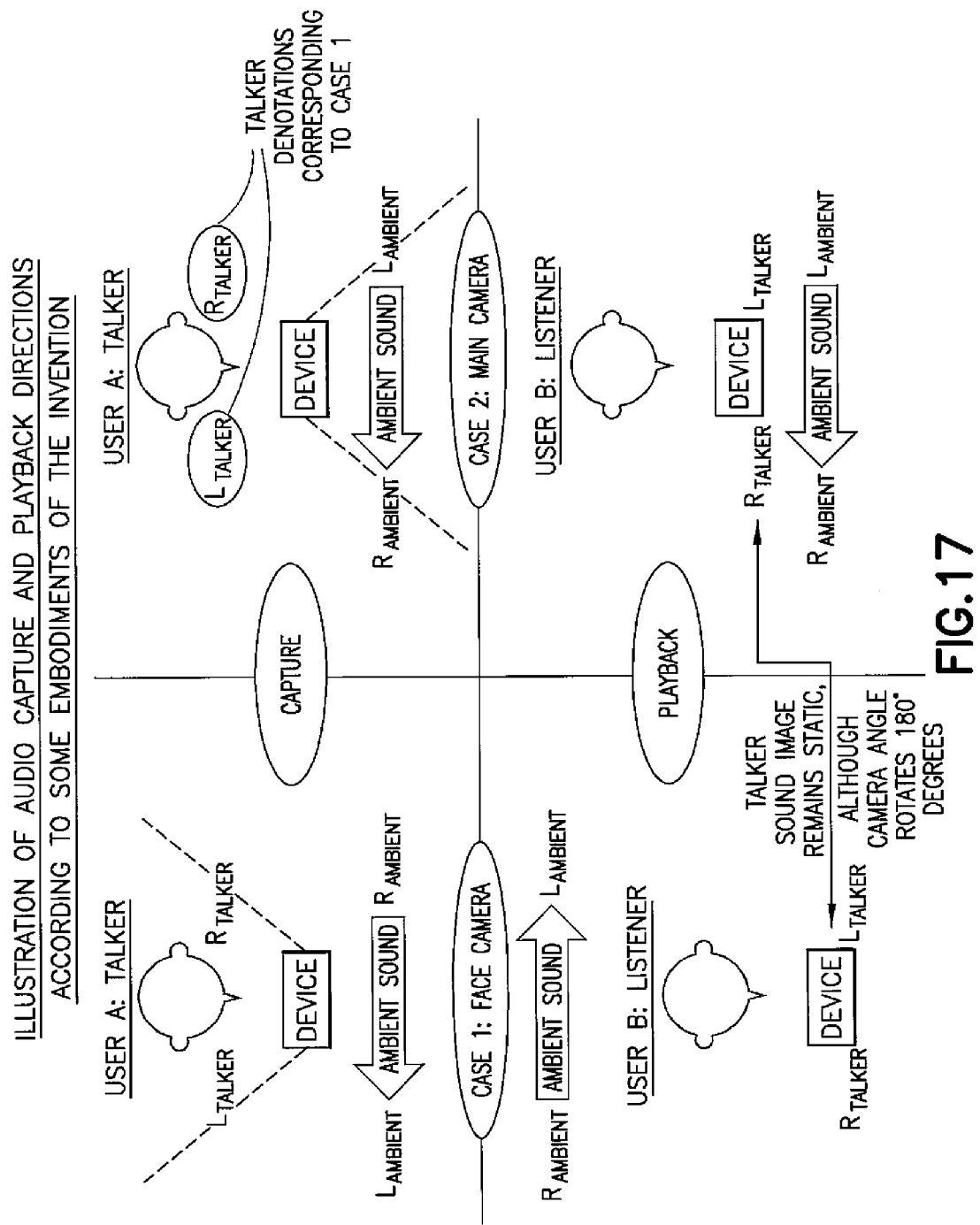
FIG. 17 is another diagram illustrating an example use of audio capture and playback directions relative to the apparatus shown in FIGS. 1-2 and the video capture direction.

An example embodiment may maintain the left and right channel (or any number of channels) of the speech signal static in relation to the device regardless of switching of the active camera. The ambient signal, on the other hand, may switch as triggered by the switching of the camera view. When the front-facing camera is utilized, the talker is thus maintained and the ambience may be suppressed (at least slightly). When the view switches to the main camera, the talker may be maintained in the previous orientation, but the ambient signal follows the new camera view and the suppression goes to zero (or other default). FIG. 17 illustrates the capture and rendering at a high level.

In some embodiments, the speech signal may be mono (e.g., spoken words are captured by a mono headset or microphone) while the device captures multi-channel audio. In these embodiments, the same separation principle and suppression of the ambient signal may be used. The speech signal may be perceived as a mono source (with a predefined panning) or the speech signal becomes directional when audible cues from the other microphone signals are utilized to provide a directional multi-channel rendering of the speech signal. In various embodiments, the device orientation (portrait, landscape) may result in a selection of the microphones corresponding to, e.g., the left and right signal. This follows from the fact that a different set or pair of microphones correspond to left and right depending on device orientation.

An example method may comprise generating audio signals from microphones of an apparatus; determining which camera(s) of a plurality of cameras of the apparatus has been selected for use; based upon the determined camera(s) selected for use, selecting an audio processing mode for the audio signals to be processed, where the audio processing mode at least partially automatically adjusts the audio signals based upon the determined camera(s) selected for use.

The method may further comprise creating separate speech signals from the audio signals. The method may comprise attenuating the audio signals based upon the determined camera(s) selected for use and then combining the separate speech signals with the attenuated audio signals. The separate speech signals may be combined with the attenuated audio signals on less than all channels carrying the attenuated audio signals. The separate speech signals may be combined with the attenuated audio signals on only one channel carrying the attenuated audio signals. The method may comprise attenuating the audio signals based upon the determined camera(s) selected for use and providing the separate speech signals on a separate channel than the attenuated audio signals. Creating separate speech signals from the audio signals may comprise use of facial detection. The method may comprise, when the camera(s) selected for use includes a first camera, assigning the audio signals from a first one of the microphones as a left channel signal and a second one of the microphones as a right channel signal; and when the camera(s) selected for use includes a second camera, assigning the audio signals from the first microphone as the right channel signal and the second microphone as the left channel signal. The method may further comprise creating separate speech signals from the audio signals and maintaining a spatial direction corresponding to the separate speech signals as substantially unchanged when the first camera or the second camera is selected.

When the camera(s) selected for use switches from the first camera to the second camera, rotating an auditory image of the sounds received by the first and second microphone slowly between the left and right channels. The method may comprise, when the camera(s) selected for use includes a first camera, selecting a first one of the audio processing modes for the audio signals to be processed; and when the camera(s) selected for use includes a second camera, selecting a second different one of the audio processing modes for the audio signals to be processed, where the first and second cameras face different directions, and further comprising creating separate speech signals from the audio signals for the first mode and not creating separate speech signals from the audio signals for the second mode.

An embodiment may be provided in an apparatus comprising at least one processor; and at least one non-transitory memory including computer program code, the at least one memory and the computer program code configured to, with the at least one processor, cause the apparatus to: determine which camera(s) of a plurality of cameras of the apparatus has been selected for use; based upon the determined camera(s) selected for use, select an audio processing mode for audio signals from microphones of the apparatus to be processed, where the audio processing mode at least partially automatically adjusts the audio signals based upon the determined camera(s) selected for use.

The at least one memory and the computer program code may be configured to, with the at least one processor, cause the apparatus to create separate speech signals from the audio signals. The at least one memory and the computer program code may be configured to, with the at least one processor, cause the apparatus to attenuate the audio signals based upon the determined camera(s) selected for use and then combine the separate speech signals with the attenuated audio signals. The at least one memory and the computer program code may be configured to, with the at least one processor, cause the apparatus to combined the separate speech signals with the attenuated audio signals on less than all channels carrying the attenuated audio signals. The at least one memory and the computer program code may be configured to, with the at least one processor, cause the apparatus to combined the separate speech signals with the attenuated audio signals on only one channel carrying the attenuated audio signals. The at least one memory and the computer program code may be configured to, with the at least one processor, cause the apparatus to attenuate the audio signals based upon the determined camera(s) selected for use and providing the separate speech signals on a separate channel than the attenuated audio signals. The at least one memory and the computer program code may be configured to, with the at least one processor, cause the apparatus to create the separate speech signals from the audio signals with use of facial detection. The at least one memory and the computer program code may be configured to, with the at least one processor, cause the apparatus to: when the camera(s) selected for use includes a first camera, assign the audio signals from a first one of the microphones as a left channel signal and a second one of the microphones as a right channel signal; and when the camera(s) selected for use includes a second camera, assign the audio signals from the first microphone as the right channel signal and the second microphone as the left channel signal. The at least one memory and the computer program code may be configured to, with the at least one processor, cause the apparatus to create separate speech signals from the audio signals and maintaining a directional information corresponding to the separate speech signals as substantially unchanged when the first camera or the second camera is selected. The at least one memory and the computer program code may be configured to, with the at least one processor, cause the apparatus to, when the camera(s) selected for use switches from the first camera to the second camera, rotate an auditory image of the sounds received by the first and second microphone slowly between the left and right channels. The at least one memory and the computer program code may be configured to, with the at least one processor, cause the apparatus to: when the camera(s) selected for use includes a first camera, selecting a first one of the audio processing modes for the audio signals to be processed; and when the camera(s) selected for use includes a second camera, selecting a second different one of the audio processing modes for the audio signals to be processed, where the first and second cameras face different directions, and further comprising creating separate speech signals from the audio signals for the first mode and not creating separate speech sound signals from the audio signals for the second mode.

An example embodiment may be provided in a non-transitory program storage device, such as the memory 24 in FIG. 3 for example, readable by a machine, tangibly embodying a program of instructions executable by the machine for performing operations, the operations comprising: determining which camera(s) of a plurality of cameras of the apparatus has been selected for use; based upon the determined camera(s) selected for use, selecting an audio processing mode for audio signals from microphones of the apparatus to be processed, where the audio processing mode at least partially automatically adjusts the audio signals based upon the determined camera(s) selected for use.

Any combination of one or more computer readable medium(s) may be utilized as the memory. The computer readable medium may be a computer readable signal medium or a non-transitory computer readable storage medium. A non-transitory computer readable storage medium does not include propagating signals and may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

An example embodiment may comprise means for generating audio signals from microphones of an apparatus; means for determining which camera(s) of a plurality of cameras of the apparatus has been selected for use; and based upon the determined camera(s) selected for use, means for selecting an audio processing mode for the audio signals to be processed, where the audio processing mode at least partially automatically adjusts the audio signals based upon the determined camera(s) selected for use.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. A method comprising:
   generating respective audio signals from microphones of an apparatus;
   determining which camera(s) of a plurality of cameras of the apparatus has been selected for use;
   selecting an audio processing mode from a plurality of different audio processing modes for at least one of the respective audio signals to be processed, where the selecting is based at least partially upon which of the camera(s) of the plurality of cameras have been determined to have been selected for use, where the at least one respective audio signal is at least partially automatically adjusted based upon which camera(s) of the plurality of cameras have been determined to have been selected for use to thereby form at least one adjusted audio signal, and where the at least one adjusted audio signal at least partially forms an audio rendering which is concentrated on sounds considered to be important based on which of the audio processing modes is selected.

2. A method as in claim 1 further comprising creating separated speech signals from the respective audio signals.

3. A method as in claim 2 where the adjusting of the at least one respective audio signal comprises attenuating the at least one respective audio signal based upon the determined camera(s) selected for use and providing the separated speech signals on a separate channel than the attenuated audio signal(s).

4. A method as in claim 2 where the creating of the separated speech signals from the respective audio signals comprises use of facial detection and/or voice activity detection (VAD).

5. A method as in claim 1 further comprising:
   when the camera(s) selected for use includes a first camera, assigning the respective audio signals from a first one of the microphones as a left channel signal and the respective audio signals from a second one of the microphones as a right channel signal; and
   when the camera(s) selected for use includes a second camera, assigning the respective audio signals from the first microphone as the right channel signal and the respective audio signals from the second microphone as the left channel signal.

6. A method as in claim 5 further comprising creating separated speech signals from the respective audio signals and maintaining a spatial direction corresponding to the separated speech signals as substantially unchanged when the first camera or the second camera is selected.

7. A method as in claim 5 where, when the camera(s) selected for use switches from the first camera to the second camera, rotating an auditory image of the sounds received by the first and second microphone slowly between the left and right channels.

8. A method as in claim 1 where:
   when the camera(s) selected for use includes a first camera, selecting a first one of the audio processing modes for the at least one respective audio signal to be processed; and
   when the camera(s) selected for use includes a second camera, selecting a second different one of the audio processing modes for the at least one respective audio signal to be processed,
   where the first and second cameras face different directions, and further comprising creating separated speech signals from the respective audio signals for the first mode and not creating separated speech signals from the respective audio signals for the second mode.

9. A method as in claim 1 where the at least one respective audio signal is processed comprising at least partially separated speech and ambient audio signals being processed.

10. A method as in claim 1 where the selected audio processing mode comprises audio object separation including converting a multi-microphone signal into audio objects and trajectories.

11. A method as in claim 1 where the selected audio processing mode comprises processing of at least one of the audio signals from the microphones so as to cause one of: perception of a mono speech signal in the audio rendering; and perception of a directional speech signal based upon cues from at least two microphones of the apparatus.

12. A method comprising:
generating respective audio signals from microphones of an apparatus;
determining which camera(s) of a plurality of cameras of the apparatus has been selected for use;
based upon the determined camera(s) selected for use, selecting an audio processing mode for at least one of the respective audio signals to be processed, where the audio processing mode at least partially automatically adjusts the at least one respective audio signal based upon the determined camera(s) selected for use; and
creating separated speech signals from the respective audio signals,
where the adjusting of the at least one respective audio signal comprises attenuating the at least one respective audio signal based upon the determined camera(s) selected for use and then combining the separated speech signals with the at least one attenuated audio signal.

13. A method as in claim 12 where the separated speech signals are combined with the at least one attenuated audio signal on less than all channels carrying the at least one attenuated audio signal.

14. A method as in claim 13 where the separated speech signals are combined with the at least one attenuated audio signal on only one channel carrying the at least one attenuated audio signal.

15. An apparatus comprising:
at least one processor; and
and at least one non-transitory memory including computer program code, the at least one memory and the computer program code configured to, with the at least one processor, cause the apparatus to:
determine which camera(s) of a plurality of cameras of the apparatus has been selected for use;
select an audio processing mode from a plurality of different audio processing modes for respective audio signals from at least two microphones of the apparatus to be processed, where the selecting is based at least partially upon which of the camera(s) have been determined to have been selected for use, where at least one of the respective audio signals is at least partially automatically adjusted based upon which camera(s) of the plurality of cameras have been determined to have been selected for use.

16. An apparatus as in claim 15 where the at least one memory and the computer program code are configured to, with the at least one processor, cause the apparatus to create separated speech signals from at least one of the respective audio signals.

17. An apparatus as in claim 16 where the at least one memory and the computer program code are configured to, with the at least one processor, cause the apparatus to combine the separated speech signals with the adjusted audio signal(s) on less than all channels carrying the adjusted audio signal(s).

18. An apparatus as in claim 16 where the at least one memory and the computer program code are configured to, with the at least one processor, cause the apparatus to combine the separated speech signal(s) with the adjusted audio signal(s) on only one channel carrying the adjusted audio signal(s).

19. An apparatus as in claim 16 where the at least one memory and the computer program code are configured to, with the at least one processor, cause the apparatus to attenuate the at least one respective audio signal based upon the determined camera(s) selected for use and providing the separated speech signals on a separate channel than the attenuated audio signals.

20. An apparatus as in claim 16 where the at least one memory and the computer program code are configured to, with the at least one processor, cause the apparatus to create the separated speech signals from the respective audio signals with use of facial detection and/or voice activity detection (VAD).

21. An apparatus as in claim 15 where the at least one memory and the computer program code are configured to, with the at least one processor, cause the apparatus to:
when the camera(s) selected for use includes a first camera, assign the respective audio signals from a first one of the microphones as a left channel signal and the respective audio signals from a second one of the microphones as a right channel signal; and
when the camera(s) selected for use includes a second camera, assign the respective audio signals from the first microphone as the right channel signal and the respective audio signals from the second microphone as the left channel signal.

22. An apparatus as in claim 21 where the at least one memory and the computer program code are configured to, with the at least one processor, cause the apparatus to create separated speech signals from the respective audio signals and maintaining a spatial direction corresponding to the separated speech signals as substantially unchanged when the first camera or the second camera is selected.

23. An apparatus as in claim 15 where the at least one memory and the computer program code are configured to, with the at least one processor, cause the apparatus to, when the camera(s) selected for use switches from the first camera to the second camera, rotate an auditory image of the sounds received by the first and second microphone slowly between the left and right channels.

24. An apparatus as in claim 15 where the apparatus is configured such that, based upon the respective .audio signals from the at least two microphones, a mono signal is created which is focused on a person speaking as captured by the at least one camera.

25. An apparatus as in claim 15 where the apparatus is configured to select the at least two microphones based upon orientation of the apparatus.

26. An apparatus comprising:
at least one processor; and
at least one non-transitory memory including computer program code, the at least one memory and the computer program code configured to, with the at least one processor, cause the apparatus to:
determine which camera(s) of a plurality of cameras of the apparatus has been selected for use;
based upon the determined camera(s) selected for use, select an audio processing mode for respective audio signals from at least two microphones of the apparatus to be processed, where the audio processing mode at least partially automatically adjusts at least one of the respective audio signals from at least one of the microphones based upon the determined camera(s) selected for use to thereby form at least one adjusted audio signal, where the apparatus is configured to create separated speech signals from at least one of the respective audio signals, and combine the separated speech signals with the at least one adjusted audio signals based upon the determined camera(s) selected for use.

27. An apparatus as in claim 26 where at least one of the respective audio signals is at least partially automatically adjusted comprising attenuating, where the at least one adjusted audio signal is at least one attenuated audio signal.

28. An apparatus comprising:
at least one processor; and
and at least one non-transitory memory including computer program code, the at least one memory and the computer program code configured to, with the at least one processor, cause the apparatus to:
  determine which camera(s) of a plurality of cameras of the apparatus has been selected for use;
  based upon the determined camera(s) selected for use, select an audio processing mode for respective audio signals from at least two microphones of the apparatus to be processed, where the audio processing mode at least partially automatically adjusts at least one of the respective audio signals based upon the determined camera(s) selected for use;
  when the camera(s) selected for use includes a first camera, selecting a first one of the audio processing modes for the respective audio signals to be processed; and
  when the camera(s) selected for use includes a second camera, selecting a second different one of the audio processing modes for the respective audio signals to be processed.

29. An apparatus as in claim 28 where the first and second cameras face different directions, and the apparatus is configured to create separated speech signals from the respective audio signals for the first mode and not creating separated speech signals from the respective audio signals for the second mode.

30. A method comprising:
generating respective audio signals from microphones of an apparatus;
determining which camera(s) of a plurality of cameras of the apparatus has been selected for use;
based upon the determined camera(s) selected for use, selecting an audio processing mode for at least one of the respective audio signals to be processed, where the audio processing mode at least partially automatically adjusts the at least one respective audio signals based upon the determined camera(s) selected for use,
where:
  when the camera(s) selected for use includes a first camera, assigning the respective audio signals from a first one of the microphones as a first channel signal and a second one of the microphones as a different second channel signal; and
  when the camera(s) selected for use includes a second camera, assigning the respective audio signals from the first microphone as the second channel signal and the second microphone as the first channel signal.

31. A method comprising:
generating respective audio signals from microphones of an apparatus;
determining which camera(s) of a plurality of cameras of the apparatus has been selected for use;
based upon the determined camera(s) selected for use, selecting an audio processing mode for at least one of the respective audio signals to be processed, where the audio processing mode at least partially automatically adjusts the at least one respective audio signals based upon the determined camera(s) selected for use,
where:
  when the camera(s) selected for use includes a first camera, selecting a first one of the audio processing modes for the respective audio signals to be processed; and
  when the camera(s) selected for use includes a second camera, selecting a second different one of the audio processing modes for the respective audio signals to be processed.

32. A method as in claim 31 where the first and second cameras face different directions, and further comprising creating separated speech signals from the respective audio signals for the first mode and not creating separated speech signals from the respective audio signals for the second mode.

33. An apparatus comprising:
at least one processor; and
and at least one non-transitory memory including computer program code, the at least one memory and the computer program code configured to, with the at least one processor, cause the apparatus to:
  determine which camera(s) of a plurality of cameras of the apparatus has been selected for use;
  based upon the determined camera(s) selected for use, select an audio processing mode for respective audio signals from at least two microphones of the apparatus to be processed, where the audio processing mode at least partially automatically adjusts at least one of the respective audio signals based upon the determined camera(s) selected for use,
  when the camera(s) selected for use includes a first camera, assign the respective audio signals from a first one of the microphones as a first channel signal and the respective audio signals from a second one of the microphones as a second channel signal; and
  when the camera(s) selected for use includes a second camera, assign the respective audio signals from the first microphone as the second channel signal and the respective audio signals from the second microphone as the first channel signal.

* * * * *

UNITED STATES PATENT AND TRADEMARK OFFICE
CERTIFICATE OF CORRECTION

| | | |
|---|---|---|
| PATENT NO. | : 9,747,068 B2 | Page 1 of 1 |
| APPLICATION NO. | : 14/579354 | |
| DATED | : August 29, 2017 | |
| INVENTOR(S) | : Laaksonen et al. | |

It is certified that error appears in the above-identified patent and that said Letters Patent is hereby corrected as shown below:

In the Claims

Claim 11, Column 15, Line 6, "from at least two microphones of the apparatus" should read "from at least two of the microphones of the apparatus".

Claim 23, Column 16, Line 44, "first and second micropohone" should read "first and second microphones".

Claim 24, Column 16, Line 47, ".audio" should be "audio".

Claim 24, Column 16, Line 50, change "the at least one camera" to --at least one of the camera(s)--.

Claim 28, Column 17, Line 22, after "select an audio processing mode" insert --from a plurality of audio processing modes--.

Claim 31, Column 18, Line 11, after "select an audio processing mode" insert --from a plurality of audio processing modes--.

Claim 33, Column 18, Lines 33-34, delete the second "and".

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*